No. 734,871. PATENTED JULY 28, 1903.
C. M. HOPWOOD & J. G. MURDOCK, Jr.
STEAM GENERATOR.
APPLICATION FILED AUG. 26, 1902.
NO MODEL.
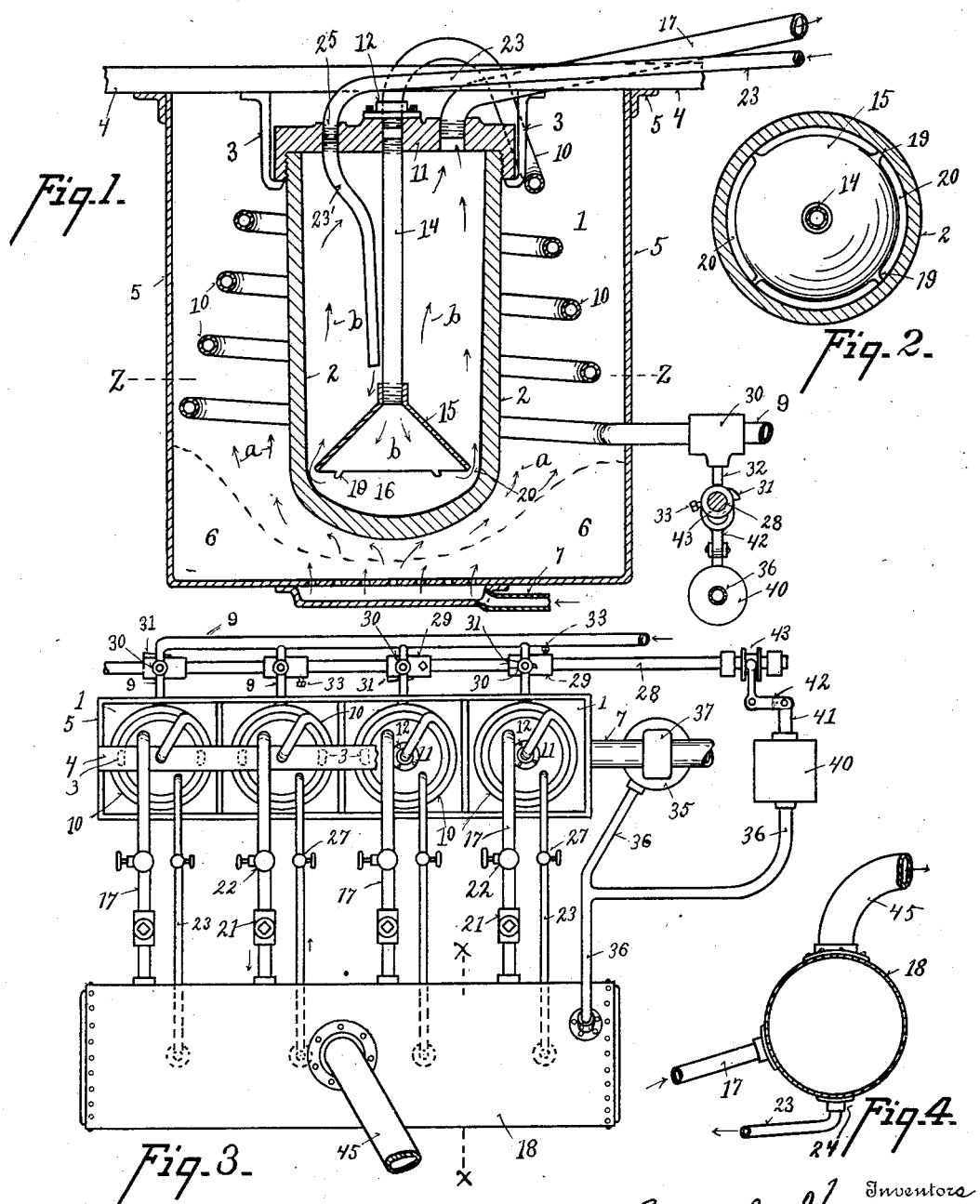

No. 734,871.

Patented July 28, 1903.

UNITED STATES PATENT OFFICE.

CLARENCE M. HOPWOOD AND JOHN G. MURDOCK, JR., OF CINCINNATI, OHIO.

STEAM-GENERATOR.

SPECIFICATION forming part of Letters Patent No. 734,871, dated July 28, 1903.

Application filed August 26, 1902. Serial No. 121,052. (No model.)

*To all whom it may concern:*

Be it known that we, CLARENCE M. HOPWOOD and JOHN G. MURDOCK, Jr., citizens of the United States, residing at Cincinnati, in the county of Hamilton and State of Ohio, have jointly invented certain new and useful Improvements in Steam-Generators, of which the following is a specification.

Our invention relates to steam-generators, and has for its object the providing of means whereby steam may be quickly and economically generated and converted into a dry or superheated state; and the invention will be readily understood from the following description, taken in connection with the accompanying drawings, in which—

Figure 1 is a central vertical section of the fire box or chamber and fire-pot, also showing the pipes leading to and from the fire-pot. Fig. 2 is a horizontal cross-section of the fire-pot, taken on the line $z\ z$ of Fig. 1. Fig. 3 is a plan view of our improved device; Fig. 4, a cross-section of the steam drum or receiver, taken on the line $x\ x$ of Fig. 3.

1 is a fire-chamber in which a pot 2 is adapted to be suitably suspended or held in position, as by means of hangers 3, suspended from a cross-girth 4, resting on the walls 5 of the fire-chamber. A bed of fuel 6 is under the pot, with the lower end of the pot preferably close to the fuel or embedded in it. The fuel is preferably subjected to a forced draft, as from a duct 7, for creating great heat at the bottom of the pot and heating the bottom of the pot to a high temperature. The bottom of the pot may be heated to a red-glow heat or above. The pot is preferably of cast-steel, with its bottom and walls near the bottom of greater thickness than the top for insuring greater safety at the point of application of greatest heat.

A feed-water pipe 9 is provided through which the feed-water for the steam-generator is adapted to be fed under pressure, as by means of an ordinary feed-water pump. (Not shown, because well known.) The feed-water is fed, preferably, in a heated state as near the boiling-point as possible. The feed-water pipe 9 connects with a coil 10 in the fire-chamber and outside the pot, the coil preferably taking about the pot a number of times and being spiral in form, so as to have as much of its surface as possible subjected to the heat in the fire-chamber. The pot 2 is provided with a cap 11, suitably secured to it, as by being screwed thereon. In the form shown the end of the coil 10 screws into a flange-piece 12, suitably bolted to the cap. A pipe 14 is screwed into the bottom of the cap and takes into the interior of the pot and has a baffle-plate 15 at its lower end. The baffle-plate is preferably in the form of an inverted cone, forming a chamber 16 thereunder. The feed-water pipe 9, the coil 10, and pipe 14 form a feeding-pipe for the interior of the pot and are shown in the form illustrated as convenient means for conducting the feed-water into the interior of the pot. While the water passes through the coil 14 it is subjected to the heat of the heated zone above the fire, absorbing heat in its passage, and when it discharges into the interior of the pot it is of a high temperature and substantially in the form of saturated steam. As soon as it leaves the bottom of the pipe 14 it spreads into the highly-heated zone 16, under the baffle-plate and above the bottom of the pot, the heavier particles striking the bottom of the pot and recoiling against the baffle-plate or flashed into steam. The water is thus converted into steam of high temperature in the form of dry and superheated steam. This dry or superheated steam passes upwardly between the baffle-plate and the walls of the pot and passes through an outlet-pipe 17 into a receiver or steam-drum 18. The baffle-plate preferably has toes 19, adapted to take against the interior walls of the pot, assuring passage 20 between the edge of the baffle-plate and the interior walls of the pot.

A series of fire chambers and pots may be employed for feeding one steam-drum. The connecting-pipe 17 between the fire-pot and receiver may be provided with a back-check valve 21 to prevent back passage of steam from the receiver and with a hand-valve 22. A return-pipe 23 from the steam-drum to the pot may also be provided for returning condensation from the steam-drum to the pot and for circulation. This return-pipe taps into the bottom of the steam-drum, as at 24, and is suitably let into the pot, as by being screwed into the cap, as at 25, a continuation 23' passing into the pot to a point preferably just above the baffle-plate into a zone of comparative quiet in the pot. A valve 27 is provided for the return-pipe.

The direction of circulation of heat in the fire-chamber is indicated by arrows $a$ outside the fire-pot, and the direction of circulation of hot water and steam through the pipes and pot is indicated by arrows $b$.

It will be noted that the return-pipe discharging condensation above the baffle-plate will cause condensation to be absorbed by the highly-heated or superheated steam just issuing from the bottom of the pot, the heavier particles of the condensation being permitted to pass over the edge of the baffle-plate into the highly-heated zone thereunder. It is obvious also that the return-pipe may be connected with the feed-water pipe or pass through the baffle-plate, so that the condensation may be discharged directly into the heated chamber 16 below the baffle-plate.

By means of our improved device steam is generated to a very high temperature or superheated very quickly with minimum amount of fuel, because the feed-water is highly heated during its passage through the coil in the fire-chamber and may be discharged into the pot in the form of saturated steam at the bottom of the pot, which bottom of the pot is highly heated by a blast of fire applied to its bottom, thereby localizing the direct application of heat and permitting a comparative small fire to be employed, the fire being in the nature of a blast-furnace, such as is used by blacksmiths. The consumption of fuel is minimized, owing to the amount of air supplied to the fuel during combustion, thereby also increasing the heat efficiency of the fuel. Subjecting the saturated steam passing into the chamber 16 to great heat, thereby producing highly-heated dry or superheated steam, also largely increases the expansive qualities of the steam, resulting in great pressure, with a minimum amount of consumption of fuel.

As stated, a series of fire pots and chambers may be employed, preferably separated by the walls 5, each fire-pot discharging separately into the receiver and, if desired, also receiving the condensation separately from the receiver, so that in case of accident to any pot or fire-chamber it may be easily disconnected by closing the valves between the fire-pot and the steam-drum and in the feed-water pipe, the balance of the series of units of steam generation being permitted to continue their steam-generating functions. Having a series of steam-generators also permits the steam generation to be divided between the several steam-generating units. Thus predetermined quantities of feed-water may be admitted at predetermined periods to each of the fire-pots, depending on the amount of steam consumption and capacity of the plant. For conveniently permitting this we have provided a trip-shaft 28, having a series of trippers 29, each operating a valve 30 on the feed-water pipes communicating with the respective pots. The trippers may each have a wedge-piece 31, adapted to strike a spring-pressed arm 32 of the valve, the valve remaining open while the wedge-piece is in engagement with the arm, the duration of engagement and injection of feed-water increasing as the point of engagement is higher up on the wedge. The number of revolutions of the shaft determines the number of times the levers are tripped, and the levers of the successive fire-pots are preferably tripped in succession, so that the feed from the pots to the receiver may be regular. Thus the trippers may be adjustably secured to the shaft by set-screws 33, with the successive wedges for the several units arranged progressively about the axis of the trip-shaft for successively operating the several valves, as shown in Fig. 3. Means may also be provided for automatically regulating the amount of draft to the fire-chambers and the amount of water passing into the coils. Thus an ordinary diaphragm or spring-pressure regulator 35 may be suitably disposed and connected with a pipe 36 from the receiver, the regulator operating a valve 37 in the draft-pipe 7, increasing the blast with a decrease of pressure and decreasing the draft with increase of pressure in the receiver.

For regulating the supply of feed-water a pressure-regulator 40, connected with the pipe 36, may be employed, the plunger-stem 41, connecting with a bell-crank 42, which in turn takes into a collar 43, mounted on the trip-shaft 28 for moving the trip-shaft endwise, increasing the supply of feed-water at a decrease of pressure in the receiver and decreasing the supply of feed-water with increasing pressure in the receiver. If desired, separate regulators may be employed for each unit of steam generation, in which case the several draft-regulators are separately connected to separate draft-pipes for the several units and the several feed-water regulators connected with separate trip-shafts for the separate units of steam generation in manner which will be readily understood. The steam may be taken from the receiver by a pipe 45, communicating with the engine or other utilizing point. A heat-retaining packing may cover the receiver.

We claim—

1. In a steam-generator, the combination of a feed-pipe, means for heating the water therein, a pot, a baffle-plate therein in the form of a cone having an open base adjacent to the bottom of the pot, means for heating said pot and a steam-receiver.

2. In a steam-generator, the combination of a feed-pipe, means for heating the water therein, a pot a baffle-plate therein in the form of a cone having an open base adjacent to the bottom of the pot, means for heating said pot, a steam-receiver, with a return-pipe from the receiver to the pot for condensation.

3. In a steam-generator, the combination of a heating-pot, having a closed bottom, a baffle-plate inside the pot near its bottom in the form of a cone having an open base, a feed-water pipe leading under the baffle-plate, with a connection between the space under the baffle-plate and the space above the baffle-plate in the pot.

4. In a steam-generator, the combination of a heating-pot, having a closed bottom, a baffle-plate inside the pot near its bottom in the form of a cone having an open base, a feed-water pipe leading under the baffle-plate, a connection between the space under the baffle-plate and the space above the baffle-plate in the pot, a steam-receiver, and a connection between the steam-receiver and pot, with a return condensation-pipe between the receiver and pot.

5. In a steam-generator, the combination of a pot and a coil of feed-water piping arranged around the pot adjacent thereto, with the pot and piping arranged to be subjected to the heat of the heating agency, a baffle-plate in the pot, having the form of a cone with an open base adjacent to the bottom of the pot, with the piping communicating into the pot under the baffle-plate.

6. In a steam-generator, the combination of steam-generating units each comprising a pot having a closed bottom, a baffle-plate therein adjacent to the bottom, a feed-water pipe communicating with the interior of the pot under the baffle-plate, and a steam-receiver, with an inlet-pipe for each unit communicating with the receiver, and a discharge-pipe for condensation connecting the receiver and a unit with means for shutting off each unit from the receiver while permitting the remaining units to communicate in steam generation with the receiver.

7. In a steam-generator, the combination of steam-generating units, each comprising a pot having a closed bottom, a baffle-plate therein adjacent to the bottom, a feed-water pipe communicating with the interior of the pot under the baffle-plate, and a separate fire-chamber for each, and a steam-receiver, with an inlet-pipe for each unit communicating with the receiver, and means for shutting off each unit from the receiver while permitting the remaining units to communicate in steam generation with the receiver.

8. In a steam-generator, the combination of a series of steam-generating units each comprising a fire-chamber and an upright pot and coil of feed-pipe for the pot adjacent to the pot located in the chamber, a valve for each feed-pipe, a trip for each valve, a common receiver for the units and shifting means actuated by the pressure in the receiver for regulating the tripping of the valves by the trips.

9. In a steam-generator, the combination of a series of steam-generating units, each comprising a fire-chamber, and a pot and feed-water piping in the chamber, said feed-water piping being in the chamber adjacent to and communicating with the pot, a valve for each feed-water pipe, a trip for each valve, a common receiver for the units, and shifting means actuated by the pressure in the receiver for regulating the tripping of the valves in the feed-water pipes.

10. In a steam-generator, the combination of a series of steam-generating units each comprising a fire-chamber and an upright pot and coil of feed-pipe for the pot adjacent to the pot located in the chamber, a valve for each feed-pipe, a trip for each valve, a common receiver for the units, shifting means actuated by the pressure in the receiver, and shifting connection between said latter means and said trips.

11. In a steam-generator, the combination of a series of steam-generating units, each comprising a fire-chamber and a pot and feed-water piping in the chamber, said feed-water piping being in the chamber adjacent to and communicating with the pot, a valve for each feed-water pipe, a trip for each valve, a common receiver for the units, shifting means actuated by the pressure in the receiver, said shifting means and receiver having a steam-passage between them, and shifting connection between said latter means and said trips.

12. In a steam-generator, the combination of a series of steam-generating units each comprising a fire-chamber and an upright pot and coil of feed-pipe for the pot adjacent to the pot located in the chamber, a valve for each feed-pipe, a shaft having a trip for each valve, a common receiver for the units, a pressure-regulator actuated by the pressure in the receiver, and a connection between the pressure-regulator and said shaft.

13. In a steam-generator, the combination of a series of steam-generating units each comprising a fire-chamber and steam-generating pot and feed-pipe leading into the pot located in the chamber, a valve for each feed-pipe, a trip for each valve, a common receiver for the units, shifting means actuated by the pressure of the generated steam, said shifting means and the receiver having a steam-passage between them, and connection between said shifting means and trips communicating movement of the shifting means to the trips.

14. In a steam-generator, the combination of a series of steam-generating units each comprising a fire-chamber and steam-generating pot and feed-pipe leading into the pot located in the chamber, a valve for each feed-pipe, a shaft having a trip for each valve, a common receiver for the units, a pressure-regulator actuated by the pressure of the generated steam, said pressure-regulator and the receiver having a steam-passage between them, and connection between said pressure-regulator and shaft.

In testimony whereof we have signed our names hereto in the presence of two subscribing witnesses.

CLARENCE M. HOPWOOD.
JOHN G. MURDOCK, Jr.

Witnesses:
A. F. HERBSLEB,
RAYMOND MOELLER.